United States Patent
Qin et al.

(10) Patent No.: US 10,756,564 B2
(45) Date of Patent: Aug. 25, 2020

(54) ELECTRONIC DEVICE AND CHARGING METHOD THEREOF

(71) Applicant: Huawei Technologies Co., Ltd., Shenzhen (CN)

(72) Inventors: Muyun Qin, Shenzhen (CN); Ruimin Wang, Shenzhen (CN); Rongan Peng, Shenzhen (CN); Shaomin Qi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 15/770,084

(22) PCT Filed: Oct. 20, 2016

(86) PCT No.: PCT/CN2016/102770
§ 371 (c)(1),
(2) Date: Apr. 20, 2018

(87) PCT Pub. No.: WO2017/071528
PCT Pub. Date: May 4, 2017

(65) Prior Publication Data
US 2018/0316212 A1 Nov. 1, 2018

(30) Foreign Application Priority Data
Oct. 28, 2015 (CN) .......................... 2015 1 0725354

(51) Int. Cl.
*H02J 7/35* (2006.01)
*G04C 10/02* (2006.01)
(Continued)

(52) U.S. Cl.
CPC ................ *H02J 7/35* (2013.01); *G04C 10/02* (2013.01); *G04G 21/02* (2013.01); *G04G 19/00* (2013.01);
(Continued)

(58) Field of Classification Search
CPC . H02J 7/35; G04C 10/02; Y02E 10/58; G05F 1/67; G04G 19/00
(Continued)

(56) References Cited

U.S. PATENT DOCUMENTS 3,987,616 A  10/1976 Castegnier
4,243,928 A * 1/1981 Nazimek ................... H02J 7/35
                                                        320/101
(Continued)

FOREIGN PATENT DOCUMENTS

CN          1389931 A       1/2003
CN        201113841 Y       9/2008
(Continued)

OTHER PUBLICATIONS

Foreign Communication From a Counterpart Application, European Application No. 16858963.8, Extended European Search Report dated Jul. 17, 2018, 11 pages.

(Continued)

*Primary Examiner* — Richard V Muralidar
(74) *Attorney, Agent, or Firm* — Conley Rose, P.C.

(57) ABSTRACT

An electronic device and a charging method includes a photovoltaic power generation unit configured to charge a battery of the electronic device by using electric energy generated by a photovoltaic material included in the photovoltaic power generation unit. The charging method includes detecting light intensity applied to the photovoltaic material; and when the detected light intensity is always greater than a first preset threshold within a second preset duration, and a maximum variation within the second preset duration exceeds a second preset threshold, sampling an open-circuit voltage of the photovoltaic material, and setting a power generation parameter of the photovoltaic material according to the open-circuit voltage.

15 Claims, 3 Drawing Sheets

(51) Int. Cl.
    *G04G 21/02*     (2010.01)
    *H02J 7/00*     (2006.01)
    *G05F 1/67*     (2006.01)
    *G04G 19/00*     (2006.01)

(52) U.S. Cl.
    CPC .................. *G05F 1/67* (2013.01); *H02J 7/00* (2013.01); *Y02E 10/58* (2013.01)

(58) Field of Classification Search
    USPC ....................................................... 320/101
    See application file for complete search history.

(56) References Cited

U.S. PATENT DOCUMENTS

| | | | |
|---|---|---|---|
| 5,341,082 | A | 8/1994 | Lorenzen et al. |
| 7,126,294 | B2 * | 10/2006 | Minami .................... G05F 1/67 318/139 |
| 2002/0027620 | A1 | 3/2002 | Platz et al. |
| 2003/0010373 | A1 | 1/2003 | Tsuzuki et al. |
| 2012/0074892 | A1 | 3/2012 | Wu et al. |
| 2014/0159638 | A1 | 6/2014 | Ebersold |
| 2017/0279276 | A1 * | 9/2017 | Amin ...................... H01L 35/02 |

FOREIGN PATENT DOCUMENTS

| | | |
|---|---|---|
| CN | 201928050 U | 8/2011 |
| CN | 102420440 A | 4/2012 |
| CN | 104052108 A | 9/2014 |
| CN | 104716694 A | 6/2015 |
| CN | 104753100 A | 7/2015 |

OTHER PUBLICATIONS

Machine Translation and Abstract of Chinese Publication No. CN104052108, Sep. 17, 2014, 20 pages.
Machine Translation and Abstract of Chinese Publication No. CN104716694, Jun. 17, 2015, 9 pages.
Machine Translation and Abstract of Chinese Publication No. CN104753100, Jul. 1, 2015, 12 pages.
Foreign Communication From a Counterpart Application, PCT Application No. PCT/CN2016/102770, English Translation of International Search Report dated Dec. 28, 2016, 2 pages.
Foreign Communication From a Counterpart Application, PCT Application No. PCT/CN2016/102770, English Translation of Written Opinion dated Dec. 28, 2016, 5 pages.
Machine Translation and Abstract of Chinese Publication No. CN201113841, Sep. 10, 2008, 4 pages.
Machine Translation and Abstract of Chinese Publication No. CN201928050, Aug. 10, 2011, 7 pages.
Foreign Communication From a Counterpart Application, Chinese Application No. 201510725354.7, Chinese Office Action dated Aug. 2, 2018, 5 pages.

* cited by examiner

ELECTRONIC DEVICE AND CHARGING METHOD THEREOF

This application is a national stage application of International Patent application No. PCT/CN2016/102770, filed on Oct. 28, 2016, which claims priority to Chinese Patent Application No. 201510725354.7, filed with the Chinese Patent Office on Oct. 28, 2015 and entitled "ELECTRONIC DEVICE AND CHARGING METHOD THEREOF", the disclosures of the aforementioned applications are hereby incorporated herein by reference in their entireties.

TECHNICAL FIELD

Embodiments of the present disclosure relate to the field of electronics, and in particular, to an electronic device and a charging method thereof.

BACKGROUND

With diversified functions and compact appearance of electronic products, wearable electronic products become increasingly popular among consumers. At present, wearable electronic devices on the market mainly include a wristband and a watch. To obtain good user experience, a wearable electronic device is usually light and thin, and its battery capacity is often limited to being extremely small. Therefore, a user needs to charge the product frequently in a use process.

There are two charging manners in the prior art. A first charging manner is wired charging. For example, charging is performed by connecting a Universal Serial Bus (USB). A second charging manner is wireless charging, for example, electromagnetic induction charging or magnetic resonance charging. In this charging manner, a related control circuit and a coil that generates a magnetic field need to be disposed in a charger. A power conversion apparatus, a high-frequency filter circuit, and the like need to be disposed in an electronic product. This results in a more complex product design, and also increases product costs.

Most importantly, a wearable electronic device is a mobile device, but the foregoing two charging manners require the electronic device to connect to a charger or to be placed near a charger for charging. The wearable electronic device cannot be charged in a moving process. This greatly affects user experience.

SUMMARY

Embodiments of the present disclosure provide an electronic device and a charging method thereof, so as to charge the electronic device in a moving process, and improve user experience.

To achieve the foregoing objective, the embodiments of the present disclosure use the following technical solutions.

According to a first aspect, this application provides a charging method of an electronic device. The electronic device includes a photovoltaic power generation unit configured to charge a battery of the electronic device by using electric energy generated by a photovoltaic material included in the photovoltaic power generation unit, and the method includes detecting a quantity of movement times of the electronic device, where the quantity of movement times is an accumulative quantity of times that a movement status of the electronic device that meets a preset condition occurs within first preset duration; setting a time period according to the quantity of movement times, where the time period is a time period for sampling an open-circuit voltage of the photovoltaic material; and sampling the open-circuit voltage of the photovoltaic material according to the time period, and setting a power generation parameter of the photovoltaic material according to the open-circuit voltage, so as to make an operating point of the photovoltaic material stay at a level close to an optimal operating point as long as possible, and avoid unnecessary adjustment to the operating point to avoid output power reduction.

With reference to the first aspect, in a first possible implementation, the method includes, when the quantity of movement times is within a preset quantity range of times, the time period being set as a first time period; or when the quantity of movement times is beyond a preset quantity range of times, the time period being set as a second time period, where the second time period is greater than the first time period. The time period is set as two time periods with different lengths. The shorter time period corresponds to a case in which the electronic device does not move frequently, and an environment in which the electronic device is located does not change too much. The longer time period corresponds to a case in which the electronic device moves frequently, and even if the operating point is adjusted, the operating point is to deviate from the optimal operating point soon. In this way, the operating point of the photovoltaic material is flexibly adjusted according to a use environment.

With reference to the first aspect or the first possible implementation of the first aspect, in a second possible implementation, when it is determined that a charging interface of the electronic device is disconnected from a charging device, the charging interface is disconnected from a charging circuit of the electronic device, and the photovoltaic power generation unit and the charging circuit of the electronic device are conducted, so as to charge the electronic device by using the photovoltaic power generation unit; or when it is determined that a charging interface of the electronic device is connected to a charging device, the photovoltaic power generation unit is disconnected from a charging circuit of the electronic device, and the charging interface and the charging circuit of the electronic device are conducted, so as to charge the electronic device by using the charging device. A flexible charging manner is provided to charge the electronic device by using the photovoltaic power generation unit, and this can reduce a quantity of charging times by using the charging device (a charger) by a user.

According to a second aspect, an electronic device is provided, including a computer readable medium configured to store application program code of solutions of this application. The program code includes an instruction used to execute the method provided in the first aspect.

According to a third aspect, an electronic device is provided, including a processor, a motion sensor, a photovoltaic power generation unit, a memory, and a bus. The processor, the motion sensor, the photovoltaic power generation unit, and the memory are interconnected and complete mutual communication by using the bus. The memory is configured to store application program code of solutions of this application. When the processor invokes the program code in the memory, the method provided in the first aspect of this application is executed.

According to a fourth aspect, this application provides a charging method of an electronic device. The electronic device includes a photovoltaic power generation unit configured to charge a battery of the electronic device by using electric energy generated by a photovoltaic material included in the photovoltaic power generation unit, and the method includes detecting light intensity applied to the photovoltaic material; and when the detected light intensity is always greater than a first preset threshold within second preset duration, and a maximum variation within the second preset duration exceeds a second preset threshold, sampling an open-circuit voltage of the photovoltaic material, and setting a power generation parameter of the photovoltaic material according to the open-circuit voltage, so as to make an operating point stay at a level close to an optimal operating point as long as possible, and avoid unnecessary adjustment to the operating point to avoid output power reduction.

According to a fifth aspect, an electronic device is provided, including a computer readable medium configured to store application program code of solutions of this application. The program code includes an instruction used to execute the method provided in the fourth aspect.

According to a sixth aspect, an electronic device is provided, including a processor, a photo sensor, a photovoltaic power generation unit, a memory, and a bus. The processor, the photo sensor, the photovoltaic power generation unit, and the memory are interconnected and complete mutual communication by using the bus. The memory is configured to store application program code of solutions of this application. When the processor invokes the program code in the memory, the method provided in the fourth aspect of this application is executed.

BRIEF DESCRIPTION OF DRAWINGS

To describe the embodiments of the present disclosure more clearly, the following describes the accompanying drawings for describing the embodiments. The accompanying drawings in the following description show embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are some embodiments of the present disclosure. All other embodiments obtained by a person of ordinary skill in the art based on the embodiments of the present disclosure without creative efforts shall fall within the protection scope of the present disclosure.

Embodiments of the present disclosure provide an electronic device and a charging method thereof. The electronic device includes a photovoltaic power generation unit configured to charge a battery of the electronic device by using electric energy generated by a photovoltaic material included in the photovoltaic power generation unit, so as to achieve an objective of charging the electronic device in a moving process. The electronic device may be various mobile devices, including various wearable electronic devices, such as a portable emergency light, a smart band, or a smart watch.

Conventionally, in a charging manner in which an electronic device is connected to a charger by using a wire, and a manner in which the electronic device is wirelessly charged when the electronic device is close to the charger, the electronic device can move only within a limited range in a charging process. In the embodiments of the present disclosure, the conventional charging manners are referred to as fixed charging manners, and a manner in which the electronic device is charged by using the photovoltaic material is referred to as a mobile charging manner. According to an application scenario of the electronic device, the electronic device may be charged in a mobile charging manner, or in a manner that the mobile charging manner is combined with the fixed charging manner. The mobile charging manner is used as a main or an auxiliary charging manner of the electronic device.

Embodiment 1

Figure 1:
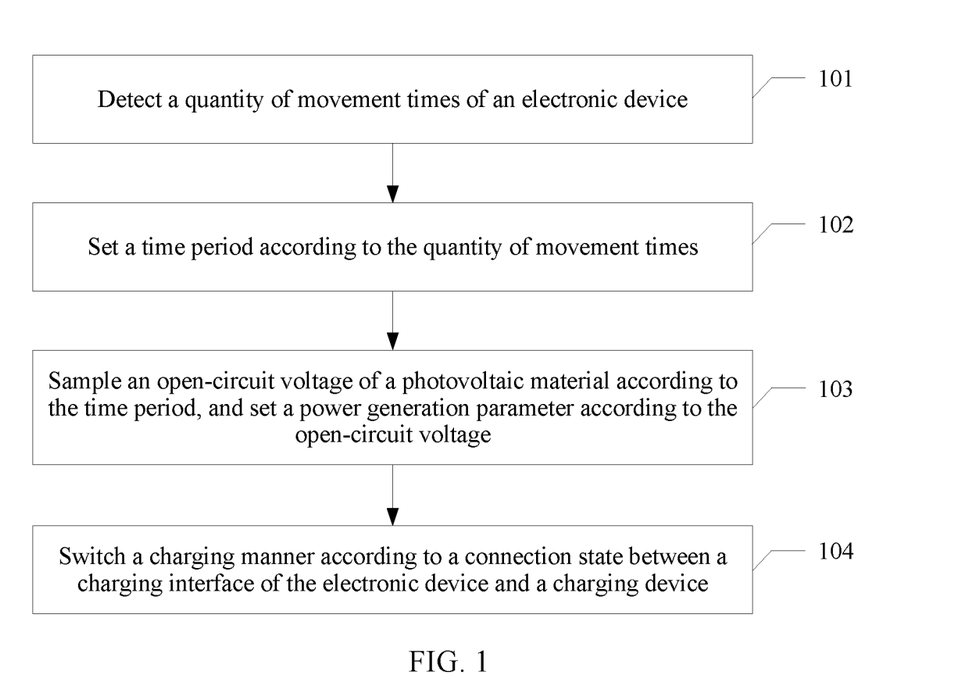
FIG. 1 is a schematic flowchart of a charging method of an electronic device according to Embodiment 1 of the present disclosure.

Embodiment 1 of the present disclosure provides a charging method of an electronic device. A quantity of times that a movement status of the electronic device that meets a specific condition occurs within a specific time period is counted, and a time interval used to adjust a power generation parameter of a photovoltaic material is set according to a counting result. As shown in FIG. 1, the method includes the following steps.

Step 101. Detect a quantity of movement times of the electronic device.

The quantity of movement times is an accumulative quantity of times that a movement status of the electronic device that meets a preset condition occurs within first preset duration.

Optionally, the electronic device may periodically detect the quantity of movement times, and a length of the first preset duration is less than a detection period. For example, the detection period may be set to 1 minute, and the first preset duration may be set to 25 seconds. Therefore, within a time period from a time point 0 to the 25th second in each detection period, the electronic device determines a quantity of movement times within the current detection period.

Alternatively, optionally, when the electronic device does not detect the quantity of movement times, and the movement status that meets the preset condition occurs for the first time, the electronic device triggers detection of the quantity of movement times, that is, starts to count the quantity of movement times. After the first preset duration, the electronic device returns the quantity of movement times to zero, and stops counting. Only when the movement status that meets the preset condition occurs again, the electronic device triggers detection of the quantity of movement times again. This detection manner may be applied to a case in which the electronic device moves frequently, so as to obtain the quantity of movement times of the electronic device in real time as far as possible. This facilitates timely adjustment to the time interval used to adjust the power generation parameter of the photovoltaic material.

The electronic device may detect the quantity of movement times of the electronic device by using a motion sensor. An application scenario in which the motion sensor is a gravity sensor is used as an example. The first preset duration may be set to 25 seconds, and the movement status that meets the preset condition may be a movement status in which a gravitational acceleration is greater than a specified value. For example, when the specified value is one gravitational acceleration, the electronic device accumulates, within 25 seconds, movement statuses in which a motion acceleration is greater than one gravitational acceleration, and uses an accumulative result as the quantity of movement times.

A motion sensor of another type may also be used to detect the quantity of movement times of the electronic device, such as a gyroscope or a magnetometer. A case in which the gyroscope is used as the motion sensor is used as an example. The movement status that meets the preset condition may be a movement status in which a rotational angular velocity of the electronic device is greater than a specified value. The preset condition may be set according to a specific type of the motion sensor.

Step 102. Set a time period according to the quantity of movement times.

The time period is a time period for sampling an open-circuit voltage of the photovoltaic material.

The electronic device includes a photovoltaic power generation unit configured to charge a battery of the electronic device by using electric energy generated by the photovoltaic material included in the photovoltaic power generation unit. Output power of the photovoltaic material is a product of an output voltage and an output current. With specific light intensity, the output power of the photovoltaic material may be adjusted by adjusting the output voltage. According to a current-voltage characteristic of the photovoltaic material, when the output voltage increases continuously within a specific range, the output power increases, and when the output voltage exceeds the range, the output power drops abruptly. Therefore, with specific light intensity, the output power of the photovoltaic material has a maximum value.

A case in which the power generation parameter of the photovoltaic material is an operating point of the photovoltaic material is used for description in this embodiment of the present disclosure. The operating point of the photovoltaic material indicates the output current and the output voltage of the photovoltaic material. The operating point of the photovoltaic material is adjusted, that is, the output current and the output voltage of the photovoltaic material are set according to current light intensity, so as to make the output power of the photovoltaic material approach a maximum value as far as possible. Generally, when the photovoltaic material operates normally, the output current remains stable. Therefore, adjusting the operating point of the photovoltaic material mainly means setting the output voltage. It should be noted that a specific value of the specified output voltage may be the same as an output voltage before resetting. This depends on whether the light intensity applied to the photovoltaic material changes, or changes amplitude. When the change amplitude of the light intensity is relatively small, the specified output voltage usually equals or approximates to the value before setting.

For ease of description, when the output power is the maximum, the operating point of the photovoltaic material is referred to as an optimal operating point in this embodiment of the present disclosure, that is, the optimal operating point is an ideal value of the operating point. Due to a mobility characteristic of the electronic device, an environment in which the electronic device is located changes continuously. This makes the operating point of the photovoltaic material deviate from the optimal operating point. Therefore, the operating point of the photovoltaic material needs to be adjusted regularly, so as to make the operating point approximate to the optimal operating point as far as possible.

Adjusting the operating point of the photovoltaic material can improve the output power of the photovoltaic material. However, in a process of adjusting the operating point of the photovoltaic material, the open-circuit voltage of the photovoltaic material needs to be sampled, and a sampling process reduces the output power of the photovoltaic material. Therefore, frequently adjusting the operating point is not good for improving the output power of the photovoltaic material.

In this embodiment of the present disclosure, setting the time period according to the quantity of movement times is intended to adjust the time period according to the quantity of movement times, so as to make the operating point of the photovoltaic material stay at a level close to the optimal operating point as long as possible, and reduce as much as possible output power reduction due to the adjustment of the operating point.

Optionally, a manner of setting the time period may be as follows. When the quantity of movement times of the electronic device is within a preset quantity range of times, the time period is set as a first time period, or when the quantity of movement times is beyond a preset quantity range of times, the time period is set as a second time period. The second time period is greater than the first time period.

For example, the first preset duration is 25 seconds, the preset quantity range of times is a closed interval from 6 to 8, the first time period is 15 seconds, and the second time period is 30 seconds. If the quantity of movement times of the electronic device within 25 seconds belongs to the closed interval from 6 to 8, the time period is set to 15 seconds. When the quantity of movement times of the electronic device within 25 seconds is less than 6, it indicates that the electronic device does not move frequently, and therefore the environment in which the electronic device is located does not change too much. Light intensity of the environment does not change or changes slightly, and therefore the time period may be set to be longer, for example, to 30 seconds. When the quantity of movement times of the electronic device within 25 seconds is greater than 8, it indicates that the electronic device moves frequently. In this case, even if the operating point is adjusted, the operating point is to deviate from the optimal operating point soon due to the frequent movement of the electronic device. To avoid output power reduction caused by the frequent adjustment of the operating point, the time period may be set to be longer, for example to 30 seconds.

Values of the quantity of movement times may be divided into more ranges, and different time periods may be set according to different ranges. Details are not described herein.

Step 103. Sample an open-circuit voltage of a photovoltaic material according to the time period, and set a power generation parameter of the photovoltaic material according to the open-circuit voltage.

A process of adjusting the operating point includes sampling the open-circuit voltage of the photovoltaic material, and setting the output voltage of the photovoltaic material according to the open-circuit voltage. The open-circuit voltage of the photovoltaic material is sampled according to the time period set in step 102. For example, if the time period is set to 15 seconds, the open-circuit voltage of the photovoltaic material is sampled once every 15 seconds. Generally, the output voltage is a product of the open-circuit voltage and a preset coefficient. The preset coefficient is between 0 and 1, for example, the preset coefficient is set to 0.8. When the open-circuit voltage of the photovoltaic material is sampled, the photovoltaic material cannot implement light-to-electricity conversion. Therefore, different time periods are set according to different quantities of movement times of the electronic device, and the power generation parameter of the photovoltaic material is adjusted according to the specified time period, so as to avoid sampling the open-circuit voltage in an unnecessary case to avoid affecting the output power of the photovoltaic material.

Step 101 to step 103 may be performed cyclically. The time period is dynamically adjusted according to the quantity of movement times, and the operating point is adjusted according to an updated time period. The operating point may be adjusted according to the quantity of movement times of the electronic device by dynamically adjusting the time period, so as to make the operating point stay at the level close to the optimal operating point as long as possible, and avoid unnecessary adjustment to the operating point to avoid output power reduction.

Step 104. Switch a charging manner according to a connection state between a charging interface of the electronic device and a charging device.

The electronic device may be charged only in a mobile charging manner or in a manner that the mobile charging manner is combined with a fixed charging manner. The mobile charging manner is used as a main or an auxiliary charging manner of the electronic device. The mobile charging manner means that the electronic device is charged by using the photovoltaic power generation unit. The fixed charging manner means that the electronic device is charged by using the charging device.

In an application scenario, the electronic device includes a charging circuit configured to charge the battery of the electronic device. The charging circuit includes a switching switch. At a same time point, the switching switch is conducted only with the photovoltaic power generation unit or the charging interface. The charging interface is configured to connect the charging device (a charger), so as to charge the electronic device by using the charging device.

When it is determined that the charging interface of the electronic device is disconnected from the charging device, the switching switch and the photovoltaic power generation unit are conducted. In this case, the charging interface is disconnected from the charging circuit of the electronic device, and the photovoltaic power generation unit and the charging circuit of the electronic device are conducted. Under a specific light condition, the electronic device is charged by using the photovoltaic power generation unit.

Alternatively, when it is determined that the charging interface of the electronic device is connected to the charging device, the switching switch and the charging interface are conducted. In this case, the photovoltaic power generation unit is disconnected from the charging circuit of the electronic device, and the charging interface and the charging circuit of the electronic device are conducted, so as to charge the electronic device by using the charging device.

A smart band is used as an example. The smart band includes a photovoltaic material configured to perform charging in the mobile charging manner. In addition, the electronic device may be charged by using a charging interface to connect a charging device. The charging interface may be a USB interface, and the charging device includes a charger or another device that supports USB output, such as a personal computer. When the USB interface of the smart band is not connected to the charging device, steps 101 to 103 are performed in the mobile charging manner, and the smart band is charged by using the photovoltaic material. When the USB interface of the smart band is connected to the charging device, the mobile charging manner is switched to the fixed charging manner, and the smart band is charged by using electric energy provided by the charging device. When the USB interface of the smart band is disconnected from the charging device, the fixed charging manner is switched back to the mobile charging manner.

In an application scenario in which the electronic device supports the mobile charging manner and the fixed charging manner, charging by using the photovoltaic power generation unit can reduce a quantity of charging times in the fixed charging manner, and improve user experience.

According to the charging method of the electronic device provided in this embodiment of the present disclosure, the quantity of movement times of the electronic device is detected, the time period is set according to the quantity of movement times, the open-circuit voltage of the photovoltaic material is sampled according to the time period, and the power generation parameter of the photovoltaic material is set according to the open-circuit voltage, so as to make the operating point stay at a level close to the optimal operating point as long as possible, and avoid unnecessary adjustment to the operating point to avoid output power reduction.

Figure 2:
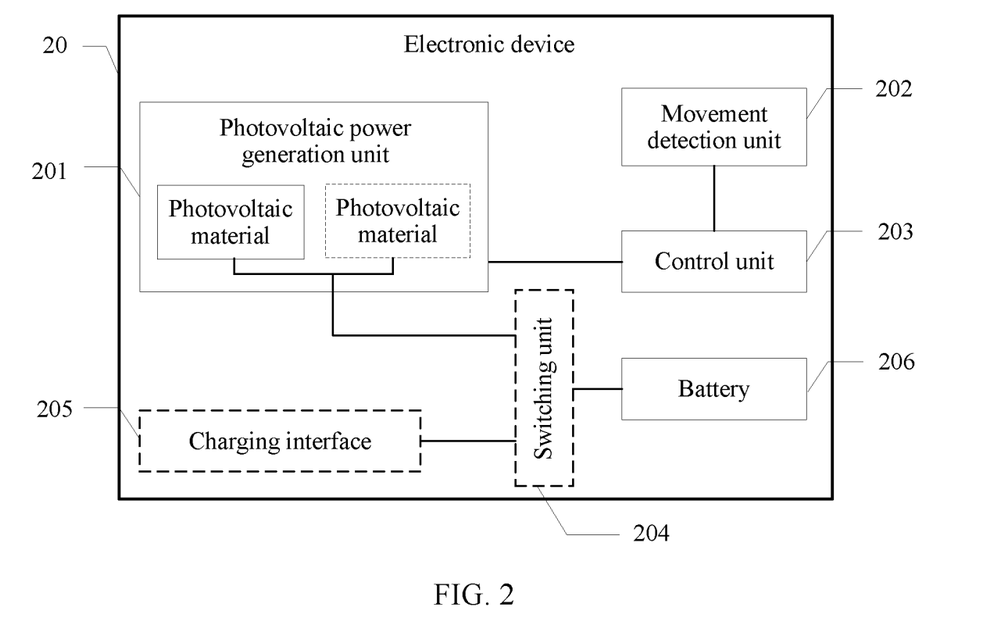
FIG. 2 is a schematic structural diagram of an electronic device according to Embodiment 1 of the present disclosure.

Based on the embodiment corresponding to FIG. 1, Embodiment 1 of the present disclosure further provides an electronic device configured to execute the charging method provided in the embodiment corresponding to FIG. 1. Referring to FIG. 2, an electronic device 20 includes a photovoltaic power generation unit 201, a movement detection unit 202, and a control unit 203.

The photovoltaic power generation unit 201 is configured to charge a battery 206 of the electronic device by using electric energy generated by a photovoltaic material included in the photovoltaic power generation unit. Optionally, the photovoltaic power generation unit 201 includes at least one photovoltaic material. When the photovoltaic power generation unit 201 includes at least two photovoltaic materials, the at least two photovoltaic materials are connected in parallel.

The movement detection unit 202 is configured to detect a quantity of movement times of the electronic device, where the quantity of movement times is an accumulative quantity of times that a movement status of the electronic device that meets a preset condition occurs within first preset duration.

The control unit 203 is configured to set a time period according to the quantity of movement times detected by the movement detection unit 202, where the time period is a time period for sampling an open-circuit voltage of the photovoltaic material.

The control unit 203 is further configured to control the photovoltaic power generation unit 201 to sample the open-circuit voltage of the photovoltaic material according to the time period, and set a power generation parameter of the photovoltaic material according to the open-circuit voltage.

Optionally, the control unit 203 is configured to, when the quantity of movement times is within a preset quantity range of times, set the time period as a first time period; or when the quantity of movement times is beyond a preset quantity range of times, set the time period as a second time period, where the second time period is greater than the first time period.

Optionally, the electronic device further includes a switching unit 204.

The switching unit 204 is configured to, when it is determined that a charging interface 205 of the electronic device is disconnected from a charging device, charge the electronic device by using the photovoltaic power generation unit; or when it is determined that a charging interface 205 of the electronic device is connected to a charging device, charge the electronic device by using the charging device. FIG. 2 shows a case in which the photovoltaic power generation unit 201 is connected to the battery 206 by using the switching unit 204. When the electronic device 20 does not include the switching unit 204, the photovoltaic power generation unit 201 is directly connected to the battery 206.

According to the electronic device provided in this embodiment of the present disclosure, the quantity of movement times of the electronic device is detected, the time period is set according to the quantity of movement times, the open-circuit voltage of the photovoltaic material is sampled according to the time period, and the power generation parameter of the photovoltaic material is set according to the open-circuit voltage, so as to make an operating point stay at a level close to an optimal operating point as long as possible, and avoid unnecessary adjustment to the operating point to avoid output power reduction.

Figure 3:
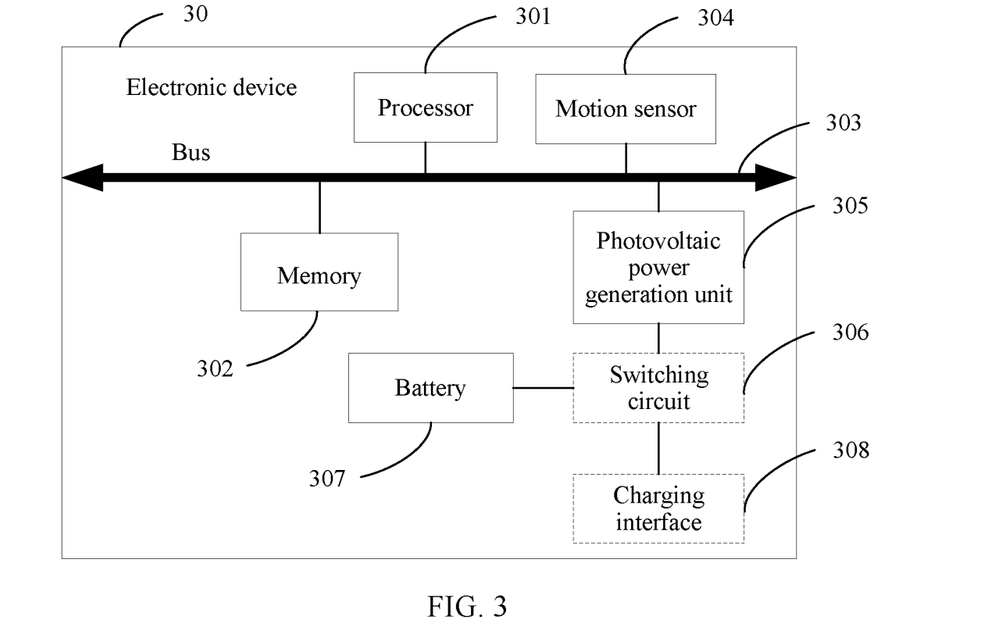
FIG. 3 is a schematic structural diagram of another electronic device according to Embodiment 1 of the present disclosure.

Based on the embodiment corresponding to FIG. 1, Embodiment 1 of the present disclosure further provides another electronic device configured to execute the charging method provided in the embodiment corresponding to FIG. 1. Referring to FIG. 3, an electronic device 30 includes a processor 301, a motion sensor 304, a photovoltaic power generation unit 305, a memory 302, and a bus 303. The processor 301, the motion sensor 304, the photovoltaic power generation unit 305, and the memory 302 are interconnected and complete mutual communication by using the bus 303. The electronic device 30 may be various mobile devices, including various wearable electronic devices, such as a portable emergency light, a smart band, or a smart watch.

The bus 303 may be an industry standard architecture (ISA) bus, a Peripheral Component Interconnect (PCI) bus, an extended industry standard architecture (EISA) bus, or the like. The bus 303 may be categorized into an address bus, a data bus, a control bus, and the like. For ease of denotation, the bus 303 is indicated by a thick arrow in FIG. 3; however, it does not indicate that there is only one bus 303 or only one type of bus 303.

The memory 302 is configured to execute application program code of the solutions of the present disclosure, where the application program code that executes the solutions of the present disclosure is stored in the memory 302, and execution thereof is controlled by the processor 301.

The memory 302 may be a read-only memory (ROM) 302 or another type of static storage device that can store static information and instructions, a random access memory (RAM) 302 or another type of dynamic storage device that can store information and instructions, or may be an electrically erasable programmable read-only memory (EEPROM) 302 or another storage device, or any other medium that can be used to carry or store expected program code in a form of an instruction or a data structure and that can be accessed by a computer, but is not limited thereto. These memories 302 are connected to the processor 301 by using the bus 303.

The processor 301 may be a central processing unit (ECPU) 301, or an application-specific integrated circuit (ASIC), or one or more integrated circuits configured to implement this embodiment of the present disclosure.

The processor 301 is configured to invoke the program code in the memory 302. In a possible implementation, when the foregoing application program is executed by the processor 301, the following functions are implemented.

The photovoltaic power generation unit 305 is configured to charge a battery 307 of the electronic device 30 by using electric energy generated by a photovoltaic material included in the photovoltaic power generation unit 305. Optionally, the photovoltaic power generation unit 305 includes at least one photovoltaic material. When the photovoltaic power generation unit 305 includes at least two photovoltaic materials, the at least two photovoltaic materials are connected in parallel.

The motion sensor 304 is configured to detect a quantity of movement times of the electronic device 30, where the quantity of movement times is an accumulative quantity of times that a movement status of the electronic device 30 that meets a preset condition occurs within first preset duration.

The processor 301 is configured to set a time period according to the quantity of movement times detected by the motion sensor 304, where the time period is a time period for sampling an open-circuit voltage of the photovoltaic material.

The processor 301 is further configured to control the photovoltaic power generation unit 305 to sample the open-circuit voltage of the photovoltaic material according to the time period, and set a power generation parameter of the photovoltaic material according to the open-circuit voltage.

Optionally, the processor 301 is configured to, when the quantity of movement times is within a preset quantity range of times, set the time period as a first time period; or when the quantity of movement times is beyond a preset quantity range of times, set the time period as a second time period, where the second time period is greater than the first time period.

Optionally, the electronic device 30 further includes a switching circuit 306.

The switching circuit 306 is configured to, when it is determined that a charging interface 308 of the electronic device 30 is disconnected from a charging device, charge the electronic device by using the photovoltaic power generation unit; or when it is determined that a charging interface 308 of the electronic device 30 is connected to a charging device, charge the electronic device by using the charging device. FIG. 3 shows a case in which the photovoltaic power generation unit 305 is connected to the battery 307 by using the switching circuit 306. When the electronic device 30 does not include the switching circuit 306, the photovoltaic power generation unit 305 is directly connected to the battery 307.

According to the electronic device provided in this embodiment of the present disclosure, the quantity of movement times of the electronic device is detected, the time period is set according to the quantity of movement times, the open-circuit voltage of the photovoltaic material is sampled according to the time period, and the power generation parameter of the photovoltaic material is set according to the open-circuit voltage, so as to make an operating point stay at a level close to an optimal operating point as long as possible, and avoid unnecessary adjustment to the operating point to avoid output power reduction.

Embodiment 2

Figure 4:
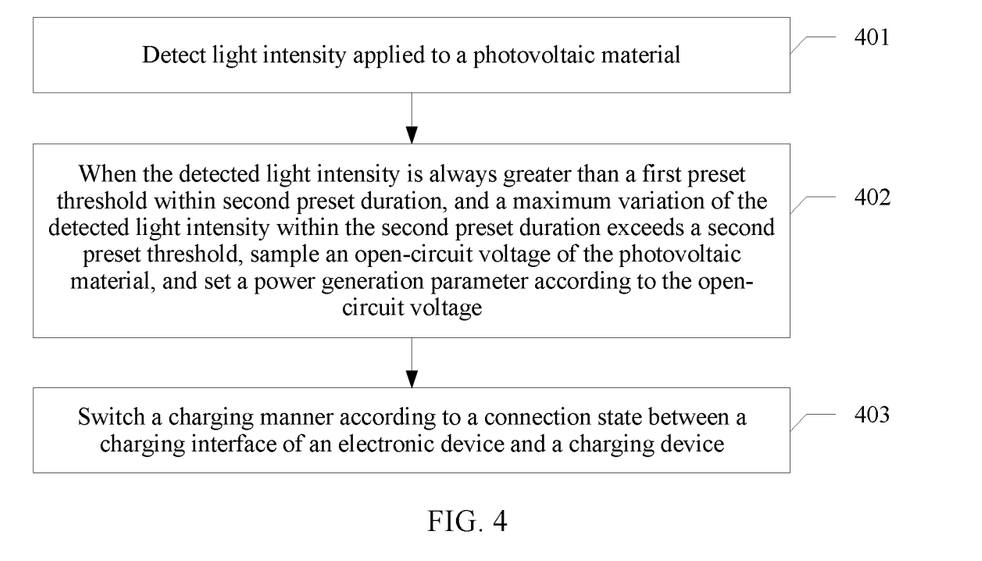
FIG. 4 is a schematic flowchart of a charging method of an electronic device according to Embodiment 2 of the present disclosure.

With reference to Embodiment 1, Embodiment 2 of the present disclosure provides a charging method of an electronic device. Referring to FIG. 4, the method includes the following steps.

Step 401. Detect light intensity applied to a photovoltaic material.

The electronic device includes a photovoltaic power generation unit and a photo sensor, where the photovoltaic power generation unit is configured to charge a battery of the electronic device by using electric energy generated by the photovoltaic material included in the photovoltaic power generation unit, and the photo sensor is configured to detect the light intensity applied to the photovoltaic material.

Optionally, the photo sensor may be an ambient light sensor (ALS), a photo resistor, a photodiode, or the like.

The ALS is used as an example. The ALS itself consumes electric energy when detecting the light intensity. Power consumption of the ALS can be reduced by adjusting a manner of detecting the light intensity by the ALS.

The manner of detecting the light intensity by the ALS includes continuous detection and periodic detection. When the detected light intensity is greater than a first preset threshold, the ALS continuously detects the light intensity applied to the photovoltaic material; or when the detected light intensity is not greater than a first preset threshold, the ALS stops continuous detection and starts to periodically detect the light intensity applied to the photovoltaic material.

The detected light intensity applied to the photovoltaic material is used to adjust a power generation parameter of the photovoltaic material according to the light intensity. A case in which the power generation parameter of the photovoltaic material is an operating point of the photovoltaic material is used as an example in this embodiment of the present disclosure to describe a value of the first preset threshold.

The ALS itself consumes electric energy when detecting the light intensity. In addition, adjusting the operating point of the photovoltaic material can improve output power of the photovoltaic material. A difference between an increased part of the output power of the photovoltaic material after adjustment to the operating point and the electric energy consumed when the ALS continuously detects the light intensity is used as a power gain. When the light intensity is relatively weak, the power gain is relatively small or even a negative value. When the light intensity is relatively strong, the power gain is positive. Optionally, the value of the first preset threshold may be set to light intensity corresponding to a power gain of 0.

Step 402. When the detected light intensity is always greater than a first preset threshold within second preset duration, and a maximum variation of the detected light intensity within the second preset duration exceeds a second preset threshold, sample an open-circuit voltage of the photovoltaic material, and set a power generation parameter of the photovoltaic material according to the open-circuit voltage.

When the light intensity is greater than the first preset threshold, a positive power gain may be obtained. When the power gain is positive, if a variation of the light intensity is relatively small, the operating point does not need to be adjusted, so as to avoid output power reduction due to adjustment to the operating point. Therefore, it is necessary to adjust the operating point only when the variation of the light intensity exceeds the second preset threshold. The variation of the light intensity is a maximum variation within the second preset duration.

With reference to step 401, when the light intensity is greater than the first preset threshold, the ALS continuously detects the light intensity applied to the photovoltaic material. If the light intensity is always greater than the first preset threshold within the second preset duration, and the maximum variation within the second preset duration exceeds the second preset threshold, the operating point of the photovoltaic material is adjusted. For example, a first threshold is 1000 lux, the second preset threshold is 500 lux, and the second preset duration is 15 seconds. Within 15 seconds, if the light intensity remains above 1000 lux, and the maximum variation exceeds 500 lux, the operating point of the photovoltaic material is adjusted in this case, that is, an output current and an output voltage of the photovoltaic material are set according to the current light intensity.

The open-circuit voltage of the photovoltaic material may be sampled in a process of adjusting the operating point of the photovoltaic material. In a sampling process, the photovoltaic material cannot implement light-to-electricity conversion. Whether to adjust the power generation parameter of the photovoltaic material is determined according to an actual light intensity change, so as to avoid sampling the open-circuit voltage in an unnecessary case to avoid affecting the output power of the photovoltaic material.

The operating point of the photovoltaic material is dynamically adjusted by cyclically performing steps 401 and 402, so as to make the operating point stay at a level close to an optimal operating point as long as possible. In addition, when the light intensity is less than the first preset threshold, the operating point does not need to be adjusted, so as to avoid unnecessary adjustment to the operating point to avoid output power reduction.

Step 403. Switch a charging manner according to a connection state between a charging interface of the electronic device and a charging device.

The electronic device may be charged only in a mobile charging manner or in a manner that the mobile charging manner is combined with a fixed charging manner. The mobile charging manner is used as a main or an auxiliary charging manner of the electronic device. The mobile charging manner means that the electronic device is charged by using the photovoltaic power generation unit. The fixed charging manner means that the electronic device is charged by using the charging device.

In an application scenario, the electronic device includes a charging circuit configured to charge the battery of the electronic device. The charging circuit includes a switching switch. At a same time point, the switching switch is conducted only with the photovoltaic power generation unit or the charging interface. The charging interface is configured to connect the charging device (a charger), so as to charge the electronic device by using the charging device.

When it is determined that the charging interface of the electronic device is disconnected from the charging device, the switching switch and the photovoltaic power generation unit are conducted. In this case, the charging interface is disconnected from the charging circuit of the electronic device, and the photovoltaic power generation unit and the charging circuit of the electronic device are conducted. Under a suitable light condition, the electronic device is charged by using the photovoltaic power generation unit.

Alternatively, when it is determined that the charging interface of the electronic device is connected to the charging device, the switching switch and the charging interface are conducted. In this case, the photovoltaic power generation unit is disconnected from the charging circuit of the electronic device, and the charging interface and the charging circuit of the electronic device are conducted, so as to charge the electronic device by using the charging device.

In an application scenario in which the electronic device supports the mobile charging manner and the fixed charging manner, charging by using the photovoltaic power generation unit can reduce a quantity of charging times in the fixed charging manner, and improve user experience.

According to the charging method of the electronic device provided in this embodiment of the present disclosure, the light intensity applied to the photovoltaic material is detected. When the detected light intensity is always greater than the first preset threshold within the second preset duration, and the maximum variation within the second preset duration exceeds the second preset threshold, the open-circuit voltage of the photovoltaic material is sampled, and the power generation parameter of the photovoltaic material is set according to the open-circuit voltage, so as to make the operating point stay at a level close to the optimal operating point as long as possible, and avoid unnecessary adjustment to the operating point to avoid output power reduction.

Figure 5:
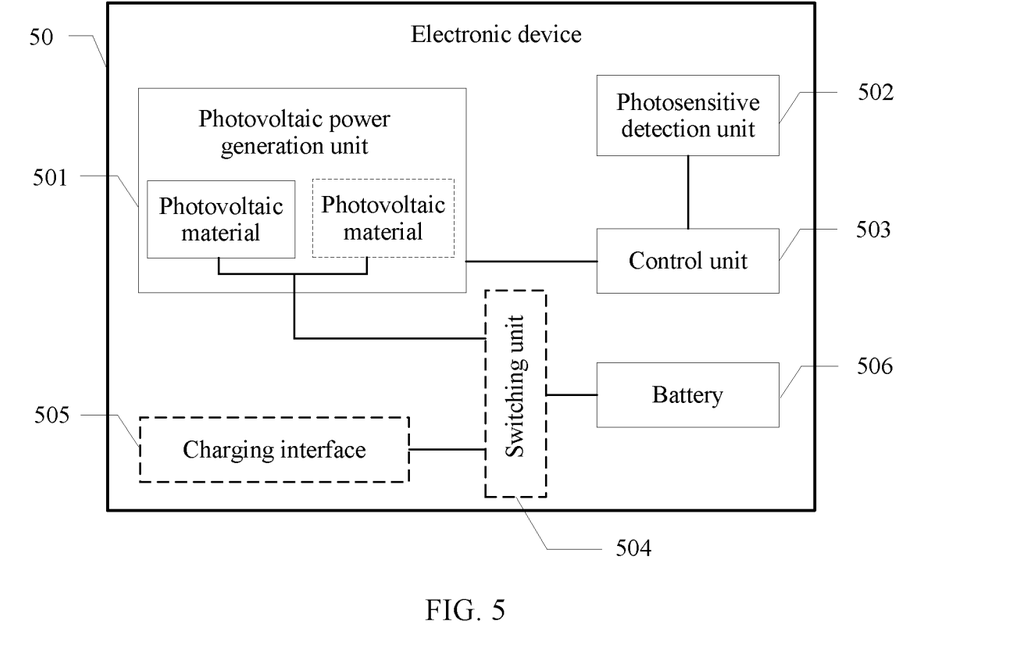
FIG. 5 is a schematic structural diagram of an electronic device according to Embodiment 2 of the present disclosure.

Based on the embodiment corresponding to FIG. 4, Embodiment 2 of the present disclosure further provides an electronic device configured to execute the charging method provided in the embodiment corresponding to FIG. 4. Referring to FIG. 5, an electronic device 50 includes a photovoltaic power generation unit 501, a photosensitive detection unit 502, and a control unit 503.

The photovoltaic power generation unit 501 is configured to charge a battery 506 of the electronic device 50 by using electric energy generated by a photovoltaic material included in the photovoltaic power generation unit 501. Optionally, the photovoltaic power generation unit 501 includes at least one photovoltaic material. When the photovoltaic power generation unit 501 includes at least two photovoltaic materials, the at least two photovoltaic materials are connected in parallel.

The photosensitive detection unit 502 is configured to detect light intensity applied to the photovoltaic material.

The control unit 503 is configured to, when the light intensity detected by the photosensitive detection unit 502 is always greater than a first preset threshold within second preset duration, and a maximum variation within the second preset duration exceeds a second preset threshold, control the photovoltaic power generation unit 501 to adjust a power generation parameter of the photovoltaic material.

Optionally, the control unit 503 is configured to, when the light intensity detected by the photosensitive detection unit 502 is greater than the first preset threshold, control the photosensitive detection unit 502 to continuously detect the light intensity applied to the photovoltaic material; or when the light intensity detected by the photosensitive detection unit 502 is not greater than the first preset threshold, control the photosensitive detection unit 502 to periodically detect the light intensity applied to the photovoltaic material.

Optionally, the electronic device 50 further includes a switching unit 504.

The switching unit 504 is configured to, when it is determined that a charging interface 505 of the electronic device 50 is disconnected from a charging device, charge the electronic device by using the photovoltaic power generation unit; or when it is determined that a charging interface 505 of the electronic device 50 is connected to a charging device, charge the electronic device by using the charging device. FIG. 5 shows a case in which the photovoltaic power generation unit 501 is connected to the battery 506 by using the switching unit 504. When the electronic device 50 does not include the switching unit 504, the photovoltaic power generation unit 501 is directly connected to the battery 506.

According to the electronic device provided in this embodiment of the present disclosure, the light intensity applied to the photovoltaic material is detected. When the detected light intensity is always greater than the first preset threshold within the second preset duration, and the maximum variation within the second preset duration exceeds the second preset threshold, the open-circuit voltage of the photovoltaic material is sampled, and the power generation parameter of the photovoltaic material is set according to the open-circuit voltage, so as to make an operating point stay at a level close to an optimal operating point as long as possible, and avoid unnecessary adjustment to the operating point to avoid output power reduction.

Figure 6:
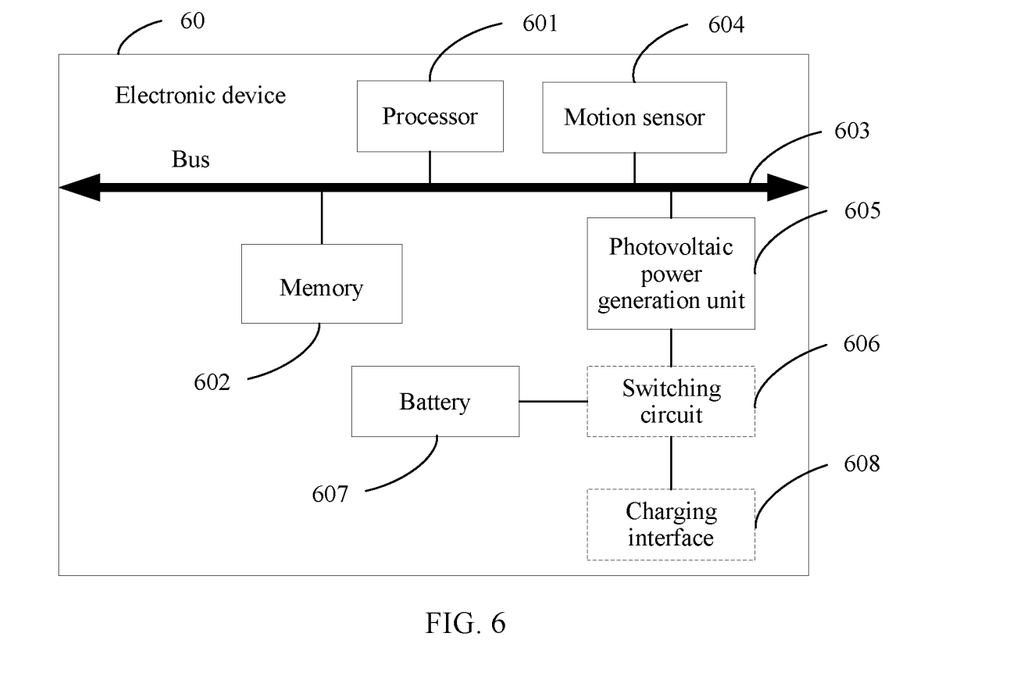
FIG. 6 is a schematic structural diagram of another electronic device according to Embodiment 2 of the present disclosure.

Based on the embodiment corresponding to FIG. 4, Embodiment 1 of the present disclosure further provides another electronic device configured to execute the charging method provided in the embodiment corresponding to FIG. 4. Referring to FIG. 6, an electronic device 60 includes a processor 601, a photo sensor 604, a photovoltaic power generation unit 605, a memory 602, and a bus 603. The processor 601, the photo sensor 604, the photovoltaic power generation unit 605, and the memory 602 are interconnected and complete mutual communication by using the bus 603. The electronic device 60 may be various mobile devices, including various wearable electronic devices, such as a portable emergency light, a smart band, or a smart watch.

The bus 603 may be an ISA bus, a PCI bus, an EISA bus, or the like. The bus 603 may be categorized into an address bus, a data bus, a control bus, and the like. For ease of denotation, the bus 603 is indicated by a thick arrow in FIG. 6; however, it does not indicate that there is only one bus 603 or only one type of bus 603.

The memory 602 is configured to execute application program code of the solutions of the present disclosure, where the application program code that executes the solutions of the present disclosure is stored in the memory 602, and execution thereof is controlled by the processor 601.

The memory 602 may be a ROM or another type of static storage device that can store static information and instructions, a RAM or another type of dynamic storage device that can store information and instructions, or may be an electrically erasable programmable read-only memory (EEPROM) or another storage device, or any other medium that can be used to carry or store expected program code in a form of an instruction or a data structure and that can be accessed by a computer, but is not limited thereto. These memories 602 are connected to the processor 601 by using the bus 603.

The processor 601 may be a CPU, or an ASIC, or one or more integrated circuits configured to implement this embodiment of the present disclosure.

The processor 601 is configured to invoke the program code in the memory 602. In a possible implementation, when the foregoing application program is executed by the processor 601, the following functions are implemented.

The photovoltaic power generation unit 605 is configured to charge a battery of the electronic device 60 by using electric energy generated by a photovoltaic material included in the photovoltaic power generation unit 605. Optionally, the photovoltaic power generation unit 605 includes at least one photovoltaic material. When the photovoltaic power generation unit 605 includes at least two photovoltaic materials, the at least two photovoltaic materials are connected in parallel.

The photo sensor 604 is configured to detect light intensity applied to the photovoltaic material.

The processor 601 is configured to, when the light intensity detected by the photo sensor 604 is always greater than a first preset threshold within second preset duration, and a maximum variation within the second preset duration exceeds a second preset threshold, control the photovoltaic power generation unit 605 to adjust a power generation parameter of the photovoltaic material.

Optionally, the processor 601 is configured to, when the light intensity detected by the photo sensor 604 is greater than the first preset threshold, control the photo sensor 604 to continuously detect the light intensity applied to the photovoltaic material; or when the light intensity detected by the photo sensor 604 is not greater than the first preset threshold, control the photo sensor 604 to periodically detect the light intensity applied to the photovoltaic material.

Optionally, the electronic device 60 further includes a switching circuit 606.

The switching circuit 606 is configured to, when it is determined that a charging interface of the electronic device 60 is disconnected from a charging device, charge the electronic device by using the photovoltaic power generation unit; or when it is determined that a charging interface of the electronic device 60 is connected to a charging device, charge the electronic device by using the charging device. FIG. 6 shows a case in which the photovoltaic power generation unit 605 is connected to the battery 607 by using the switching circuit 606. When the electronic device 60 does not include the switching circuit 606, the photovoltaic power generation unit 605 is directly connected to the battery 607.

According to the electronic device provided in this embodiment of the present disclosure, the light intensity applied to the photovoltaic material is detected. When the detected light intensity is always greater than the first preset threshold within the second preset duration, and the maximum variation within the second preset duration exceeds the second preset threshold, the open-circuit voltage of the photovoltaic material is sampled, and the power generation parameter of the photovoltaic material is set according to the open-circuit voltage, so as to make an operating point stay at a level close to an optimal operating point as long as possible, and avoid unnecessary adjustment to the operating point to avoid output power reduction.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging method of an electronic device, comprising:
    detecting light intensity applied to a photovoltaic material in the electronic device;
    sampling an open-circuit voltage of the photovoltaic material when the light intensity is greater than a first preset threshold within a first preset duration and a maximum variation of the light intensity within the first preset duration exceeds a second preset threshold; and
    setting a power generation parameter of the photovoltaic material according to the open-circuit voltage.

2. The method of claim 1, wherein detecting the light intensity applied to the photovoltaic material comprises continuously detecting the light intensity applied to the photovoltaic material when the light intensity is greater than the first preset threshold.

3. The method of claim 1, further comprising disconnecting a charging interface from a charging circuit of the electronic device, and conducting the photovoltaic power generator and the charging circuit of the electronic device when the charging interface of the electronic device is disconnected from a charging device, so as to charge the electronic device by using the photovoltaic power generator.

4. The method of claim 1, wherein detecting the light intensity applied to the photovoltaic material comprises periodically detecting the light intensity applied to the photovoltaic material when the light intensity is lesser than or equal to the first preset threshold.

5. The method of claim 1, further comprising disconnecting the photovoltaic power generator from a charging circuit of the electronic device and conducting a charging interface and the charging circuit of the electronic device when the charging interface of the electronic device is connected to a charging device, so as to charge the electronic device by using the charging device.

6. An electronic device, comprising:
    a photovoltaic power generator, the photovoltaic power generator being configured to charge a battery of the electronic device by using electric energy generated by a photovoltaic material comprised in the photovoltaic power generator;
    a photosensitive detector, the photosensitive detector being configured to detect light intensity applied to the photovoltaic material; and
    a controller coupled to the photovoltaic generator, the controller being configured to control the photovoltaic power generator to adjust a power generation parameter of the photovoltaic material when the light intensity at the photosensitive detector is greater than a first preset threshold within a first preset duration and a maximum variation of the light intensity within the first preset duration exceeds a second preset threshold.

7. The electronic device of claim 6, wherein the controller is configured to control the photosensitive detector to continuously detect the light intensity applied to the photovoltaic material when the light intensity at the photosensitive detector is greater than the first preset threshold.

8. The electronic device of claim 6, further comprising a switch, the switch being configured to disconnect the charging interface from a charging circuit of the electronic device; and conduct the photovoltaic power generator and the charging circuit of the electronic device when the charging interface of the electronic device is disconnected from a charging device, so as to charge the electronic device by using the photovoltaic power generator.

9. The electronic device of claim 6, wherein the controller is configured to control the photosensitive detector to periodically detect the light intensity applied to the photovoltaic material when the light intensity at the photosensitive detector is lesser than or equal to the first preset threshold.

10. The electronic device of claim 6, further comprising a switch, the switch being configured to disconnect the photovoltaic power generator from a charging circuit of the electronic device and conduct the charging interface and the charging circuit of the electronic device when the a charging interface of the electronic device is connected to a charging device, so as to charge the electronic device by using the charging device.

11. An electronic device, comprising:
a bus;
a photovoltaic power generator comprising a photovoltaic material, the photovoltaic power generator being coupled to the bus, the photovoltaic power generator being configured to charge a battery of the electronic device by using electric energy generated by the photovoltaic material;
a photosensor coupled to the photovoltaic power generator through the bus, the photosensor being configured to detect light intensity applied to the photovoltaic material;
a memory coupled to the bus; and
a processor coupled to the memory, the processor being configured to control the photovoltaic power generator to adjust a power generation parameter of the photovoltaic material when the light intensity is greater than a first preset threshold within a first preset duration and a maximum variation of the light intensity within the first preset duration exceeds a second preset threshold.

12. The electronic device of claim 11, wherein the processor is further configured to control the photosensor to continuously detect the light intensity applied to the photovoltaic material when the light intensity detected by the photosensor is greater than the first preset threshold.

13. The electronic device of claim 11, further comprising a switch, the switch being configured to disconnect a charging interface from a charging circuit of the electronic device and conduct the photovoltaic power generator and the charging circuit of the electronic device when the charging interface of the electronic device is disconnected from the charging device, so as to charge the electronic device by using the photovoltaic power generator.

14. The electronic device of claim 11, wherein the processor is further configured to control the photosensor to periodically detect the light intensity applied to the photovoltaic material when the light intensity is lesser than or equal to the first preset threshold.

15. The electronic device of claim 11, further comprising a switch, the switch being configured to disconnect the photovoltaic power generator from a charging circuit of the electronic device and conduct a charging interface and the charging circuit of the electronic device when the charging interface is connected to a charging device, so as to charge the electronic device by using the charging device.

* * * * *